United States Patent [19]

Holland

[11] 4,028,199

[45] June 7, 1977

[54] METHOD OF PRODUCING METAL POWDER

[75] Inventor: Frank Stanley Holland, Stockport, England

[73] Assignee: National Development Research Corporation, London, England

[22] Filed: July 30, 1975

[21] Appl. No.: 600,253

Related U.S. Application Data

[63] Continuation-in-part of Ser. No. 495,003, Aug. 5, 1974, abandoned.

[30] Foreign Application Priority Data

Feb. 25, 1975 United Kingdom ............... 7736/75

[52] U.S. Cl. ................................. 204/10; 204/114; 204/218

[51] Int. Cl.² ...................... C25C 5/00; C25C 5/02; C25C 1/16

[58] Field of Search ............ 204/10, 130, 140, 212, 204/216, 131, 218, 215, 114

[56] References Cited

UNITED STATES PATENTS

| | | | |
|---|---|---|---|
| 1,019,969 | 3/1912 | Lacroix | 204/212 |
| 1,251,302 | 12/1917 | Tainton | 204/10 |
| 1,535,577 | 4/1925 | Cleave | 204/216 |
| 2,673,179 | 3/1954 | Duncan et al. | 204/10 |

Primary Examiner—T. M. Tufariello
Attorney, Agent, or Firm—Beveridge, DeGrandi, Kline & Lunsford

[57] ABSTRACT

A metal powder e.g. copper or zinc, is produced from a dilute aqueous solution of the metal by subjecting the dilute aqueous solution to electrolysis in a cell having a rotating cylinder cathode and in accordance with the equation:

$$I = KCV^x$$

where I is the current density, K is a constant for a given cell, C is the concentration of metal ion in aqueous solution, V is the peripheral velocity of the rotating cylinder cathode and $x = 0.7$ to $1.0$. A diaphragm cell is preferably used. Dilute aqueous solutions treated include mining liquors and viscose rayon plant effluent.

This invention relates to metals and is particularly concerned with the recovery or extraction of metals in powder form by electrolytic means.

32 Claims, 6 Drawing Figures

METHOD OF PRODUCING METAL POWDER

This application is a continuation-in-part of abandoned application Ser. No. 495,003, filed Aug. 5, 1974 and relating to the recovery of zinc in powder form from viscose rayon plant effluent. The entire disclosure of said co-pending application is relied upon and incorporated herein by reference.

The production or manufacture of metal powders by electrolytic means is well known, for example see Electrochemical Engineering by C. L. Mantel 4th Edition, published by McGraw Hill Book Company in 1960. In practice, cathode current densities for powder production are higher than those of refining of metals to give massive cathodes (600 amps/m$^2$ compared with 100 amps/m$^2$) and the concentration of the metal in powder production is lower than in refining (5 grams/liter compared with approximately 40 grams/liter). The metal deposits as discrete particles at the cathode and is collected at the bottom of the cell, or as a loosely adherent deposit which may be lifted from the cell and washed off the cathodes.

Certain of the processes and apparatus involve the deposition of metallic powder on a movable or continuous cathode. U.S. Pat. No. 1,736,857, for example, discloses and claims apparatus involving an endless cathode in the form of a band which continuously passes between anodes through a trough containing electrolyte. U.S. Pat. No. 2,810,682 discloses and claims a process whereby silver powder is produced from a soluble silver anode. The anode dissolves in the electrolyte and powder is formed on a disc-shaped cathode rotating slowly through the electrolyte. Deposited powder is removed as the rotating cathode surfaces pass between a pair of metallic doctor blades. The powder settles to the bottom of the electrolyte bath and is periodically recovered by filtering the electrolyte. U.S. Pat. No. 1,959,376 discloses a process and U.S. Pat. No. 2,053,222 discloses an apparatus for producing copper powder. According to these patents, a series of disc-shaped copper cathodes is mounted in an electrolytic cell tank such that each cathode is partially immersed in the electrolyte bath contained therein. Soluble copper anodes are suspended in the electrolyte bath on each side of each cathode. The cathodes are rotated as a current is applied across the electrodes. Copper deposited on the rotating cathode surfaces is removed as powder by doctor blades mounted above the electrolyte surface. U.S. Pat. No. 3,616,277 discloses a process and an apparatus for producing copper powder. Metallic powder, e.g. copper powder, is deposited on a series of disc-shaped cathodes as they turn through an electrolytic solution of the metal. The cathodes, preferably of titanium, are partially immersed in a bath of electrolyte contained in an electrolytic cell tank. Insoluble anodes, preferably of platinized titanium, are disposed in the tank in interlead arrangement with the cathodes. Powder is continuously deposited on the cathodes and continuously removed by the doctor blades, preferably of plastic, mounted adjacent to the cathodes above the electrolyte level of the cell.

An electrolytic cell, using a rotating cylinder electrode, is a well known and well studied device; for example see a review by D. R. Gabe in the Journal of Applied Electrochemistry, 1974, Volume 4, page 91, and the references therein. The rotating cylinder electrode cell has been used and studied extensively for the deposition of metals. The studies of many investigators have confirmed that the current density attainable on a rotating cylinder electrode is controlled by the following equation:

$$I = K C V^x$$

where
I is the current density
K is a constant
C is the concentration of the metal ion in solution
V is the peripheral velocity of the rotating cylinder electrode, and
$x$ is about 2/3.

I expected that the production of metal powder, using a rotating cylinder electrode cell, would be possible and convenient in that the process would be continuous in the same fashion as the process described in U.S. Pat. No. 3,616,277. However, I also expected that the well established limitation on current described by the equation $I = K C V^{2/3}$ would be obeyed and that the throughput of such a device would be so controlled. I was, therefore, surprised to find that the electrolytic production of metal powders, using a rotating cylinder cathode cell, did not obey the limiting equation referred to above, but obeyed for example the following equation:

$$I = K C V^{0.92}$$

This means that the limiting current is almost directly proportional to the peripheral velocity. This also means that the throughput of such a device is considerably increased, or that the concentration of metal required to produce the metal powder at a given current density is much reduced. For example, the cell described in Example 1 below has a total limiting current controlled by the equation $I_o = 4 \times 10^{-3} C V^x$. When the peripheral velocity 'V' is 1000 cm/sec. and the concentration of copper 'C' is 200 ppm. the following comparison can be made in a process based upon the previously known characteristics of the rotating cylinder, where '$x$' equals ⅔, the total limiting current '$I_o$' is 80 amps; in the present invention 'i x' equals 0.92 and the total limting current '$I_o$' is 460 amps, i.e., an increase of 5.7 times. To sustain the higher current of 460 amps the process based upon the previously known characteristics of the rotating cylinder would need to operate at 1150 ppm. of copper, i.e., 5.75 times the concentration, or rotate at a peripheral velocity of 13788 cm/sec., i.e., nearly 14 times as fast as in the present invention. Under the conditions described the process based upon the previously known characteristics of the rotating cylinder would produce 95 grams/hour from the cell. Similarly, using the cell as described in Example 1, the current sustainable is controlled by the equation $I_o = 4 \times 10^{-3} C V^x$. If the concentration of copper 'C' equals 200 ppm. and the peripheral velocity 'V' is reduced to 500 cm/sec. the following applies — a process based upon the previously known characteristics of the rotating cylinder, where '$x$' equals ⅔ produces a current '$I_o$' of 50 amps resulting in a production of 60 grams/hour of copper powder, whereas in the present invention, where '$x$' equals 0.92, the cell produces a current of 243 amps giving 288 grams/hour of copper powder. This is nearly 5 times as much as a process based upon the previously known characteristics of the rotating cylinder. For the process based upon the previously known characteristics of the rotating cylinder to sustain such a high current and a high production rate the concentration of copper would need to be increased to 972 ppm., or the peripheral velocity increased to 5304 cm/sec., i.e., about 10 times as fast as the present invention.

I do not fully understand how the invention operates. Particles of metal are being deposited on the rotating cylinder and many of these particles are immediately dislodged. Therefore the surface is not steady and reproducible with time, a new surface being formed continuously. The surface is rather rough and the surface area is greater than the superficial area of the rotating cylinder. Therefore the actual size, the actual roughness, and the actual surface area, of the rotating cylinder on which powdered metal is being deposited cannot be defined. The fact that they cannot be defined may explain why the accepted law did not apply.

According to the present invention therefore, a method of producing a metal powder from a dilute aqueous solution of the metal comprises operating a rotating cylinder cathode cell at current densities so related to the concentration of the solution and to the peripheral velocity of the cathode as to result in said metal being deposited as particles on said cathode and allowing said particles to fall from, or causing them to be removed from, said cathode as it rotates.

The invention thus provides an electrolytic process for producing metal powders whereby a dilute aqueous solution of the metal ion is subjected to electrolysis in a cell having a rotating cylinder cathode. The peripheral speed of the rotating cylinder cathode and the current density on the cathode may be chosen in relation to the concentration of the metal ion such that a powder deposit is produced and the metal powder is dislodged from the cathode whilst rotating and discharged from the cell continuously.

Dilute aqueous solutions electrolysed according to the invention may contain from 2 to 10,000 parts per million of metal ion.

In general, the method or process of the invention may be carried out in accordance with the equation $$I = KCV^x$$

where $x = 0.7$ to $1.0$, preferably $0.8$ to $0.93$; I, K, C and V have the meanings given previously above and may have the following operable and preferred ranges of values:

Concentration, C—2ppm – 10,000 ppm operable 2ppm – 1,000 ppm preferred
Current Density, I —1 mA/cm$^2$ – 10 Amps/cm$^2$ operable 1 mA/cm$^2$ – 1 Amp/cm$^2$ preferred
Peripheral Velocity —1 cm/sec – 10,000 cm/sec operable
of Rotating Cylinder —10 cm/sec – 2,000 cm/sec preferred. Electrode, V K is a constant and refers to a particular cell and therefore cannot be defined as having operable and preferred ranges of value. The value of K depends on the metal being deposited as well as temperature and cell geometry, and could lie in the range $2 \times 10^{-7}$ to $5 \times 10^{-6}$.

In organic electrochemistry, organic material may be decomposed at the counter electrode, e.g. a cathodic reduction may give a product at the cathode which is oxidised and degraded at the anode. In this case it is common (see M. J. Allen, Organic Electrochemistry, Chapman & Hall, 1954) to use a partition between the electrodes, thus defining a cathode compartment, and an anode compartment. Various materials have been used as partitions, including parchment, asbestos cloth, other cloths and ion exchange membranes which allows the electricity to pass through but retain organic materials in whichever compartment is required.

The ion exchange membranes including ion exchange material, such as the ion exchange membranes commonly used in electrodialysis.

The invention therefore includes the further features that the method is carried out in a cell which includes a diaphragm, such as an ion exchange diaphragm, positioned between the rotating cathode and the anode or anodes of the cell.

The invention further includes a cell which comprises a rotating cylinder cathode in a confined compartment with substantially concentric anodes and a means of supplying liquor to and removing liquor from the confined compartment. The confined cathode compartment may be formed by a more or less concentric anode or anode compartments.

The invention also includes the further feature of separating the metal powder produced from the other materials contained in the electrolytic cell. This separation may be effected by fairly simple physical means such as settling, hydrocyclone separation or other simple liquid/solid separation.

The preferred metals which may be recovered by means of the invention are copper and zinc, but other metals may also be recovered e.g. chromium, manganese, iron, cobalt, nickel, ruthenium, rhodium, palladium, silver, cadmium, indium, tin, iridium, platinum, gold, lead, uranium and the rare earth metals.

An important feature of the process of the invention is that it produces the metal in the form of a powder, which is easy to remove from the electrolytic cell.

The invention also includes the concept of controlling the working electrode potential and this may be done by techniques known in themselves. This is important for best results in zinc deposition but is not so critical for copper deposition. The preferred means for controlling the cell voltage or the electrode potential can be a voltage regulator or a potentiostat, the voltage regulator (if used) controlling the cell voltage, and the potentiostat (if used) controlling the electrode potential.

Control of the pH of the electrolyte is also desirable in the case of zinc as described more fully below, a suitable range being pH 4 to 7.

The cell can be supplied with any form of electric current e.g. direct current, alternating current, pulsed direct current or mixtures thereof, and the cell voltage can be controlled or the electrode potential controlled accordingly e.g. by using a reference electrode. The cell is operable at voltages of 2 to 250 volts, a preferred range being 2 to 20 volts.

The period of time for which the cell is operated does not appear to be critical. However, the operating temperature of the cell is significant if optimum yields are to be obtained. Increasing the temperature of the aqueous electrolyte increases the total mass transfer to the cathode. While in general the operating temperature may be in between 0° C and 100° C., it is preferred to use an operating temperature in the range 20° C to 80° C. A suitable operating temperature is about 60° C.

The electrolyte used in the method of the invention may be any water-soluble electrically-conducting salt of the metal being produced. In the case of copper or zinc, a preferred salt is the sulphate. Other electrolytes may also be present.

The rotating cylinder cathode of the cell used in the method of the invention may in general be made of any suitable metal but for reasons of economy it is preferred to use a cathode made of steel which is suitably coated, for example with a layer of the metal to be deposited. Thus a steel cathode coated with copper may be used for copper deposition and a steel cathode coated with zinc for zinc deposition. The anode or each anode of the cell is preferably made of a relatively corrosion-resistant metal, for example a noble metal such as platinum, but less expensive such as lead may also be used. An alternative form of anode which may be used is one made of valve metal coated with the noble metal. Suitable valve metals are titanium, zirconium, tantalum and hafnium and any of these may be coated with platinum.

The invention provides a cheap, continuous electrolytic plant and process, able to recover metals from dilute solutions. Dilute solutions of metals (ca 2 - ca 2,000 ppm.) can be treated efficiently, the economics depending on the concentration. Stronger solutions can also be treated by dilution of the cell effluent, so that the concentration in the cell is within a convenient range (e.g. 200–300 ppm.). Because the cell is diaphragmed, very "dirty" solutions can be treated, e.g. those containing organics and other anode destroying components.

In general, the metal obtained from the process is of high purity. In particular, the metal obtained by the electrodeposition of copper onto a rotating cylinder electrode is of much higher purity than metal obtained by the deposition of copper from dilute solutions by the cementation process i.e., by the reduction of the solution with iron. The invention is therefore particularly advantageous in its application to mining liquors.

The following are known to contain fairly low concentrations of metals:
a. Copper phthalocyanine (C.P.C.) plant effluents
b. Viscose plant effluents
c. Mining liquors, such as dump leach liquors and other mine waters.
d. Tank house bleed streams from normal electrowinning
e. Electroplating rinse waters, such as electrogalvanising rinse waters, particularly strip steel and wire.
f. Pickling solutions in copper and brass wire manufacture
g. Sewage sludge.

The following waste may be treated to produce dilute solutions at various strengths for use in the present invention.
1. Chemical Wastes
  These include:
  a. Copper wastes
    i. etchants
    ii. catalysts in chemical manufacture
    iii. pickle liquors
  b. Chromium wastes
    i. plating liquors
    ii. plating shop sludges
    iii. sludges and solutions from dichromate oxidations
  c. Nickel wastes
    i. plating liquors and plating shop sludges
    ii. electrochemical machining sludges
  d. Tin wastes
    plating liquors and plating shop sludges
  e. Zinc, etc.
    Zinc wastes from organic chemicals manufacture
2. Solid Wastes
  These wastes occur as:
  i. drosses - zinc, brass, tin, etc.,
  ii. swarfs
  iii. scrap printed circuit boards - copper and precious metals, and so on.

The electrolytic process of the invention is particularly applicable to the recovery of metallic zinc from viscose rayon plant effluents.

Viscose Rayon is manufactured by spinning viscose (cellulose xanthate in caustic soda) into sulphuric acid, containing zinc salts and other metallic sulphates (see F. D. Lewis, The Chemistry and Technology of Rayon Manufacture, 1961).

The use of zinc salts in the manufacture of viscose rayon is well known. Such salts are used throughout the world in acid spinning baths and stretching baths. Regenerated cellulose rayon made in this way contains large quantities of zinc which are removed by washing and the washings constitute one source of effluent. Acid spinning bath rejects and stretching bath rejects are other sources of effluent.

These effluents can contain:
sulphuric acid
sodium sulphate
magnesium sulphate
carbohydrates, such as glucose and other sugars, cellulose degradation products etc.,
sulphides
xanthates
surfactants, such as quaternary ammonium salts, e.g. cetylpyridinium bromide
zinc sulphate.

The treatment of these effluents is commonly carried out in two ways.
a. recovery of zinc sulphate solutions from acid spinning bath and stretching bath effluents by recrystallising out the excess sodium sulphate and returning the liquor for re-use.

However, there are still zinc losses and liquor rejects because other impurities build up.
b. the dilute washings liquor and the above mentioned rejects are chemically treated with ferrous sulphate which precipitate the sulphides and with lime which neutralises the effluent and precipitates the zinc as a basic carbonate. The sludges from this treatment are considered to be harmless and are dumped on land. Thus there is no recovery of zinc.

We have found that the electrolytic process of the present invention as described above is effective in the recovery of zinc from viscose rayon plant effluents.

Improved yields of zinc are obtained if the acidity of the viscose effluent electrolysed is low e.g. between pH 4 and pH 7. Viscose effluents normally have a high acidity e.g. pH 1 and the pH of the effluent may therefore be adjusted to lower acid values to avoid a poor yield of zinc. The pH may be adjusted before electrolysis but tends to fall during electrolysis in a non-diaphragm cell. Further adjustment during electrolysis in a non-diaphragm cell is desirable but if a diaphragm cell is used, only a major initial adjustment of pH is needed for low acidity throughout the electrolysis process because pH control is achieved virtually automatically by the transfer of ions through the diaphragm, and only minor additional adjustment of pH is required.

The pH of the effluent may be adjusted by addition of an alkali, preferably caustic soda, but other alkalies, such as sodium carbonate or ammonia, may also be used; or the effluent may be buffered e.g. by the addition of sodium acetate.

The concentration of zinc in viscose effluent is commonly 0.1 to 1.0% i.e., 10 to 100 times more dilute than electrowinning zinc sulphate liquor. Further, the organic compounds present are of the type that can damage the common anode materials (e.g. platinum, lead, lead dioxide).

Thus the electrolytic recovery of the zinc metal from viscose rayon plant effluents preferably uses a cell having a. a diaphragm to prevent anode corrosion
b. a rotating cylinder electrode to give economically acceptable current densities.

In one of its preferred forms, the present invention combines:
a. the techniques of electrowinning zinc,
b. the techniques of organic electrochemistry in terms of diaphragms,
c. rotating cylinder electrode techniques, and
d. control of the pH of the viscose effluent.

Any of the electrode materials normally used in electrowinning may be used in the electrolysis of the viscose effluent but aluminium is preferred as the cathode material.

The invention will now be further described by way of example with reference to the accompanying drawings, in which.

Figure 1:
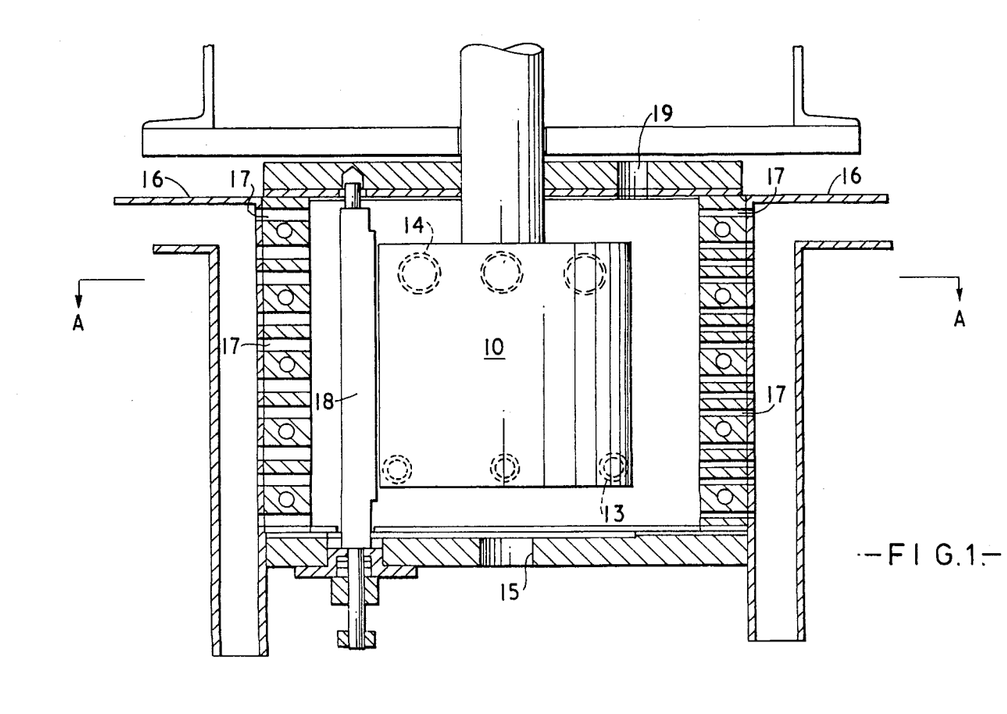
FIGS. 1 and 2 are sectional views of a rotating cylinder electrode diaphragm cell, FIG. 1 being a section on the line BB of FIG. 2 and FIG. 2 being a section on the line AA of FIG. 1.
Figure 2:
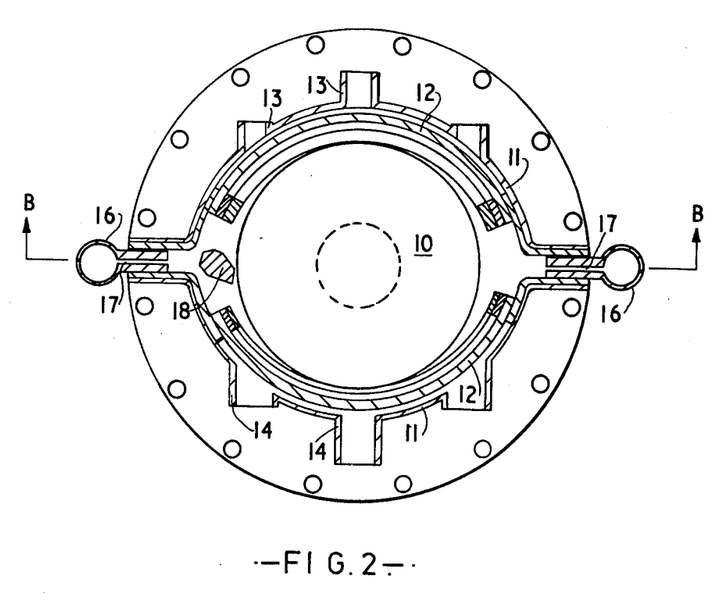

In FIGS. 1 and 2, a rotating cylinder or drum cathode 10 is separated from approximately concentric anodes 11 by a membrane or diaphragm 12 defining anode and cathode compartments. The membrane may be a cation exchange membrane, for example Du Pont Nafion, where the metal being recovered is copper or an anion exchange membrane, for example Ionac MA 3472, where the metal being recovered is zinc. Anolyte may be introduced to the cell through the ports 13 and withdrawn through the ports 14. Catholyte (electrolyte) may be introduced to the cell through the inlet hole 15 in the base of the cell and withdrawn through outlet hole 19 in the top of the cell. Alternatively, use may be made of tubes 16 which communicate with the cathode compartment through holes 17 in the cell casing. Thus the catholyte may be introduced to the cell through one of the tubes 16 and withdrawn through the other tube 16, the introduction and withdrawal being at both ends of each tube if desired. The drum 10 is provided with a scraper 18 mounted for removing metal adhering to the cathode as the cathode rotates. As shown the scraper extends over the full length of the cathode but alternatively a reciprocating scraper extending over part only of the length of the cathode may be provided.

Figure 3:
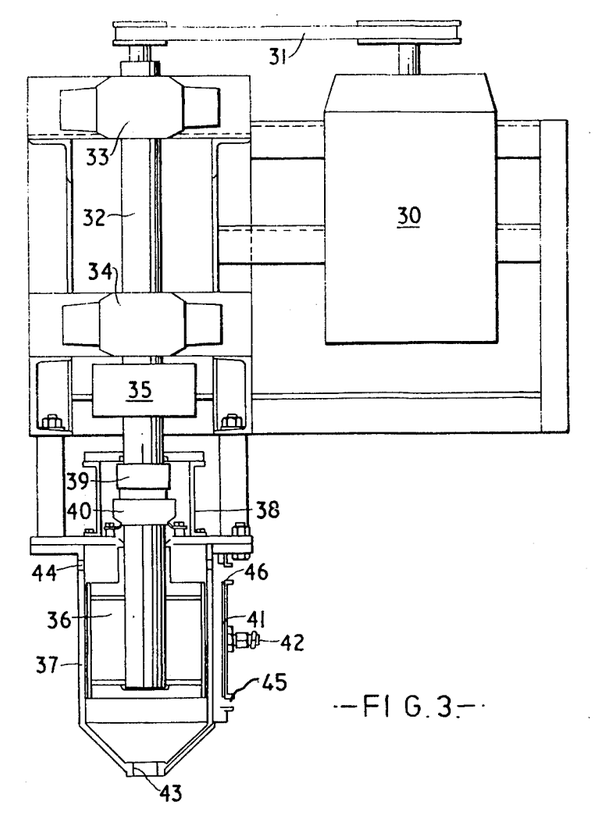
FIG. 3 shows the general arrangement of a cell of the type shown in FIGS. 1 and 2.

In FIG. 3, a motor 30 is connected by a belt drive 31 to a shaft 32 rotatably mounted in bearings 33 (without locking ring) and 34 (with locking ring). The shaft carries a slip ring assembly 35 for the supply of current to the rotatable drum cathode 36 mounted on the shaft within the electrolytic cell 37. A water cooling housing 38 is provided above the cell and where the shaft passes through the housing it is provided with seals 39, 40. The anode 41 of the cell is concentric with the drum cathode and is provided with a fixed electrical anode terminal 42. The cell has an inlet 43 and outlets 44 for catholyte and inlet 45 and outlet 46 for anolyte.

Figure 4:
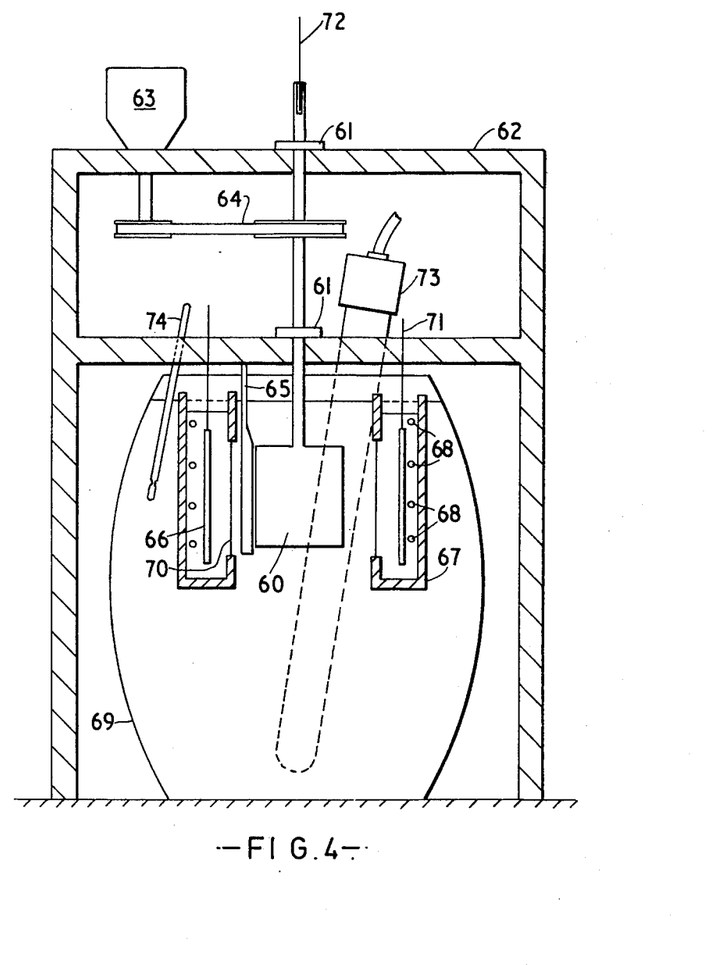
FIG. 4 shows a laboratory cell.

In FIG. 4, a rotatable cylinder cathode 60 is mounted on a shaft rotatable in bearings 61 in a support frame 62 and is driven by means of a motor 63 connected to the shaft by a belt drive 64. The frame carries a scraper 65 for the cathode. An anode 66, concentric with the cathode, is disposed in an anolyte compartment 67 having cooling coils 68, the cathode and anolyte compartment being housed in a polypropylene drum 69. Part of the wall of the anolyte compartment between the anode and the cathode is formed from an ion-exchange membrane 70. Electrical connections 71, 72 are provided for the anode and cathode respectively and the drum 69 is provided with a heater 73 and a thermometer 74.

Figures 5, 6:
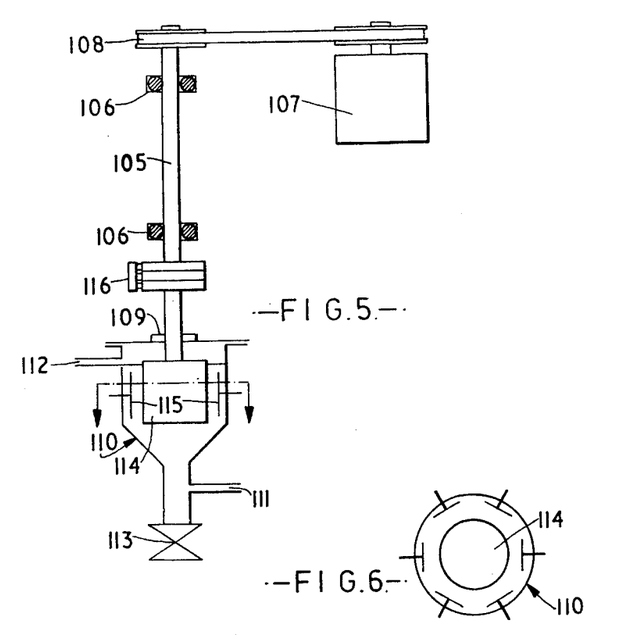
FIG. 5 is a diagrammatic vertical section of a larger rotatable electrode cell without a diaphragm.
FIG. 6 is a horizontal section on the section line shown in FIG. 5.

In FIGS. 5 and 6 a main shaft 105 is rotatably mounted in bearings 106. At its upper end, the shaft is driven from a variable speed motor 107 by means of a driving belt 108. At its lower end the shaft passes through a seal 109 into a cell 110 which is provided with a liquor inlet 111, a liquor outlet 112 and a drain valve 113. A cylindrical electrode 114 is mounted on the lower end of the shaft 105 so as to be rotatable with the shaft. Counter electrodes 115 are mounted within the cell and uniformly disposed around the rotatable electrode 114. The liquor outlet 112 determines the level of liquid in the cell and ensures immersion of the electrodes in the liquor. Current may be supplied to the rotatable electrode 114 via a slip ring assembly 116 on shaft 105.

Figure 7:
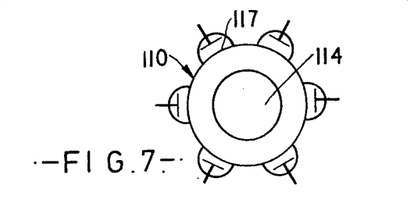
FIG. 7 is a horizontal section, corresponding to FIG. 2, of a diaghragm cell.

In FIG. 7, membranes 117 separate the counter electrodes 115 from the rotatable electrode 114 so as to form anode and cathode compartments.

Figure 8:
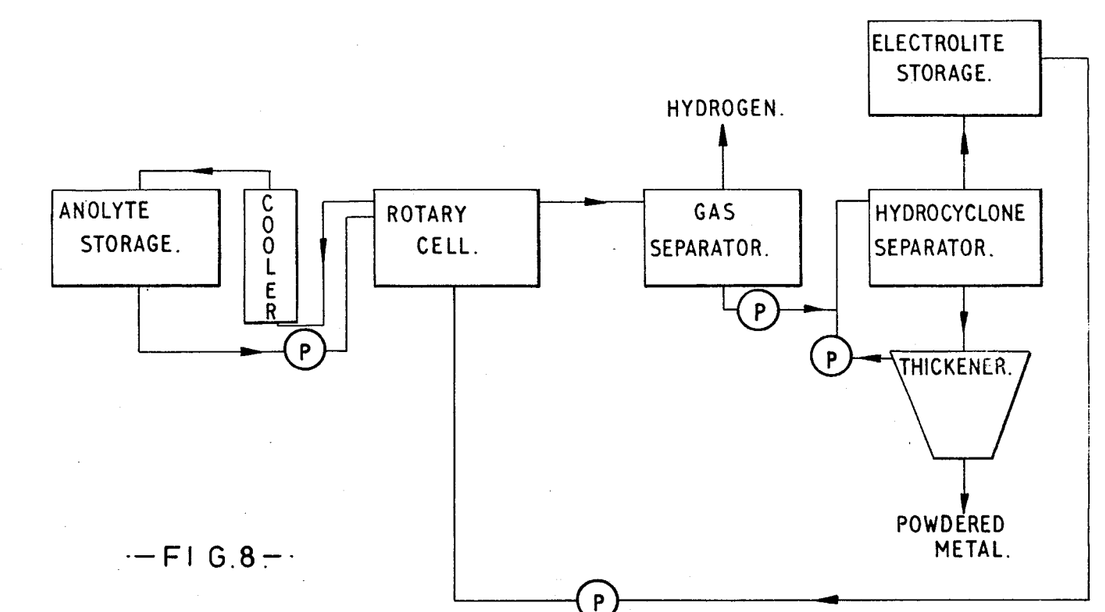
FIG. 8 is a flow diagram illustrating a metal recovery process.

The rotary cathode electrolytic cell shown in FIG. 8 has a membrance defining separate anode and cathode compartments and for this reason the anolyte is circulated in a separate circuit, being cooled on its return to storage. Electrolyte from the cathode compartment (containing metal powder and hydrogen gas produced by the electrolytic process) passes to the gas separator where the hydrogen is separated from the electrolyte and metal particles. In the hydrocyclone separator (a device well known in the art), the hydrocyclones separate the metal powder from most of the electrolyte. The thickener is a cone thickener in which the metal powder in the form of a slurry with residual electrolyte from the separator is concentrated to give a very thick slurry which can be automatically removed from the bottom of the cone and treated further as necessary. Electrolyte separated in the thickener is returned to the hydrocylcone separator. The bulk of the electrolyte from the separator passes to storage from which it is recirculated to the cathode compartment of the rotary cell. The circulation of anolyte and electrolyte is effected by means of pumps P.

The invention is further illustrated in the following Examples. The current efficiency referred to in the Examples is defined by Faraday's Laws and is well understood by persons skilled in the art. It differs from the yield of metal powder in that the yield, can mean the overall efficiency of the process including (for instance) mechanical losses from the system.

EXAMPLE 1

A cell as shown in FIGS. 1 and 2, and cell assembly as in FIG. 3 with the cylinder electrode having an area of 1687 cm² was used. The cylinder was rotated at 810 r.p.m. giving a peripheral velocity of 1000 cm per second. Copper sulphate in sulphuric acid solution was pumped into the cell at a rate of 1 liter per second, at a temperature of 60° C; the inlet concentration was 350 ppm. copper, and this was diluted in the cell to 200 ppm. copper so that the outlet concentration was 200 ppm. A current of 700 Amps was passed for 4 hours during which time the current efficiency to copper deposition was 72% and the cell produced 600 gms. of copper powder per hour at a current density of 300 mA/cm².

EXAMPLE 2

The cell described in Example 1 was used; the flow rate and temperature were the same. The cylinder was rotated at 320 rpm. giving a peripheral velocity of 393 cm/sec. The inlet concentration of copper was 900 ppm. and this was diluted in the cell to 680 ppm. so that the outlet concentration was 680 ppm. A current of 700 Amps was passed for 2 hours, during which time the current efficiency to copper deposition was 93% and the cell produced 770 gms. of copper powder per hour at a current density of 386 mA/cm².

EXAMPLE 3

The cell described in Example 1 was used; the flow rate and temperature were the same. The cylinder was rotated at 440 rpm. giving a peripheral velocity of 541 cm/sec. The inlet concentration of copper was 571 ppm. and this was diluted in the cell to 385 ppm. so that the outlet concentration was 385 ppm. A current of 700 Amps was passed for 4.25 hours, during which time the current efficiency to copper deposition was 80% and the cell produced 664 gms. of copper powder per hour at a current density of 332 mA/cm².

EXAMPLE 4

The cell described in Example 1 was used; the flow rate and temperature were the same. The cylinder was rotated at 1380 rpm. giving a peripheral velocity of 1698 cm/sec. The inlet concentration of copper was 200 ppm. and this was diluted in the cell to 98 ppm. so that the outlet concentration was 98 ppm. A current of 550 Amps was passed for 4 hours, during which time the current efficiency to copper deposition was 70% and the cell produced 456 gms. of copper powder per hour at a current density of 228 mA/cm².

EXAMPLE 5

The cell described in Example 1 was used; the flow rate and temperature were the same. The cylinder was rotated at 810 rpm. giving a peripheral velocity of 1000 cm/sec. The inlet concentration of copper was 81 ppm. and this was diluted in the cell to 50 ppm. so that the outlet concentration was 50 ppm. A current of 285 Amps was passed for 3 hours, during which time the current efficiency to copper efficiency to copper deposition was 37% and the cell produced 125 gms. of copper powder per hour at a current density of 62.5 mA/cm².

EXAMPLE 6

The cell described in Example 1 was used; the flow rate and temperature were the same. The cylinder was rotated at 810 rpm. giving a peripheral velocity of 1000 cm/sec. The inlet concentration of copper was 330 ppm. and this was diluted in the cell to 190 ppm. so that the outlet concentration was 190 ppm. A current of 600 Amps was passed for 2.5 hours, during which time the current efficiency to copper deposition was 86% and the cell produced 612 gms. of copper per hour at a current density of 308 mA/cm². The average process for Examples 1 to 6 can be described by:

$$I_o = 4.23 \cdot 10^{-3} \, C \, V^{0.92}$$

where
 $I_o$ is the current in the cell producing copper powder in Amps.
 C is the concentration of copper in the cell in ppm.
 V is the peripheral velocity in cm. per second.

EXAMPLE 7

The cell described in Example 1 was used; the flow rate and temperature were the same. The cylinder was rotated at 810 rpm. giving a peripheral velocity of 100 cm/sec. The inlet concentration of copper was 368 ppm. and this was diluted in the cell to 193 ppm. so that the oulet concentration was 193 ppm. A current of 1000 Amps was passed for 1.5 hours, during which time the current efficiency to copper deposition was 50% and the cell produced 593 gms. of copper powder per hour at a current density of 296 mA/cm². This process can be described by:

$$I_o = 4.17 \cdot 10^{-3} \, C \, V^{0.93}$$

where
 $I_o$ is the current in the cell producing copper powder in Amps.
 C is the concentration of copper in the cell in ppm.
 V is the peripheral velocity in cm. per second.

EXAMPLE 8

A cell as shown in FIG. 4 with a cylinder electrode having an area of 200 cm², was used. The electrolyte was sodium sulphate (10 Kgs. anhydrous in 46 liters of solution) at pH 4 and a temperature of 60° C. The cylinder was rotated at 1800 rpm. giving a peripheral velocity of 719 cm per second; zinc sulphate solution was added continuously to the electrolyte to maintain a zinc concentration at 400 ppm. Sulphuric acid was added to maintain the pH at 4. A current of 50 Amps was passed for 1 hour 10 mins., during which time the current efficiency to zinc powder deposition was 46% and the cell produced 28 gm. of zinc powder per hour at a current density of 115 mA/cm². This process can be described by:

$$I_o = 2.5 \cdot 10^{-4} \, C \, V^{0.826}$$

where $I_o$ is the current in the cell producing zinc powder in Amps.
C is the concentration of zinc in the cell in ppm.
V is the peripheral velocity in cm. per second.

EXAMPLE 9

The cell described in Example 8 was used. The electrolyte and temperature were the same. The cylinder was rotated at 1800 rpm. giving a peripheral velocity of 719 cm/sec; zinc sulphate solution was added continuously to the electrolyte to maintain a zinc concentration of 431 ppm. Sulphuric acid was added to maintain the pH at 4. A current of 50 Amps was passed for 45 mins., during which time the current efficiency to zinc powder deposition was 37.4% and the cell produced 22.8 gm. of zinc powder per hour at a current density of 93.5 mA/cm². This process can be described by:

$$I_o = 2.2.10^{-4} \, C \, V^{0.806}$$

Where
$I_o$ is the current in the cell producing zinc powder in Amps.
C is the concentration of zinc in the cell in ppm.
V is the peripheral velocity in cm. per second.

EXAMPLE 10

The cell described in Example 8 was used. The electrolyte and temperature were the same. The cylinder was rotated at 1800 rpm. giving a peripheral velocity of 719 cm/sec; zinc sulphate solution was added continuously to the electrolyte to maintain a zinc concentration of 458 ppm. Sulphuric acid was added to maintain the pH at 4. A current of 50 Amps was passed for 2 hours, during which time the current efficiency to zinc powder deposition was 58% and the cell produced 35 gm. of zinc powder per hour at a current density of 144 mA/cm². This process can be described by:

$$I_o = 2.7.10^{-4} \, C \, V^{0.832}$$

where
$I_o$ is the current in the cell producing zinc powder in Amps.
C is the concentration of zinc in the cell in ppm.
V is the peripheral velocity in cm. per second.

EXAMPLE 11

The cell described in Example 8 was used. The electrolyte was viscose rayon plant effluent at pH 4 and a temperature of 60° C. The cylinder was rotated at 1800 rpm. giving a peripheral velocity of 719 cm/sec; zinc sulphate solution was added continuously to the electrolyte to maintain a zinc concentration of 418 ppm. Sulphuric acid was added to maintain the pH at 4. A current of 50 Amps was passed for 1 hour, during which time the current efficiency to zinc power deposition was 40.5% and the cell produced 24.7 gm. of zinc powder per hour at a current density of 101 mA/cm². This process can be described by:

$$I_o = 2.3.10^{-4} \, C \, V^{.813}$$

where
$I_o$ is the current in the cell producing zinc powder in Amps.
C is the concentration of zinc in the cell in ppm.
V is the peripheral velocity in cm. per second

EXAMPLE 12

A cell smaller but otherwise similar to that described in Example 1 was used, with the cylinder electrode having an area of 200 cm². The electrode was zinc plated stainless steel. The electrolyte was 1 Molar sodium sulphate solution at pH 4 and a temperature of 60° C. The cylinder was rotated at 800 rpm. giving a peripheral velocity of 319 cm per second, zinc sulphate solution was added to maintain a zinc concentration of the input feed of 450 ppm. The electrolyte was pumped in to the cell at a rate of 4 liters per minute; the inlet concentration was 450 ppm. zinc and this was diluted in the cell to 350 ppm. zinc so that the outlet concentration was 350 ppm. zinc. A potential difference between the rotating cylinder electrode and a nearby mercury-mercurous sulphate reference electrode of 1.86 volts was maintained such that the rotating cylinder electrode was cathodic to the reference electrode. This resulted in a current of 28 Amps, which was maintained for 4 hours, during which time the current efficiency to zinc powder deposition was 71% and the cell produced 24.4 gm of zinc powder per hour at a current density of 100 mA/cm². This process can be described by:

$$I_o = 3.58.10^{-4} \, C \, V^{0.88}$$

where
$I_o$ is the current in the cell producing zinc powder in Amps.
C is the concentration of zinc in the cell in ppm.
V is the peripheral velocity in cm. per second.

EXAMPLE 13

The cell described in Example 12 was used; the electrolyte and temperature were the same. The cylinder was rotated at 1200 rpm. giving a peripheral velocity of 479 cm/sec; zinc sulphate solution was added to maintain a zinc concentration of the input feed of 430 ppm. The electrolyte was pumped in to the cell at a rate of 4 liters per minute; the inlet concentration was 430 ppm. zinc and this was diluted in the cell to 350 ppm. zinc so that the outlet concentration was 350 ppm. zinc. A potential difference between the rotating cylinder electrode and a nearby mercury-mercurous sulphate reference electrode of 1.7 volts was maintained such that the rotating cylinder electrode was cathodic to the reference electrode. This resulted in a current of 16 Amps, which was maintained for 3 hours, during which time the current efficiency to zinc powder deposition was 100% and the cell produced 19.5 gm, of zinc powder per hour at a current density of 80 mA/cm² This process can be described by:

$$I_o = 2.67.10^{-4} \, C \, V^{.833}$$

where
$I_o$ is the current in the cell producing zinc powder in Amps.
C is the concentration of zinc in the cell in ppm.
V is the peripheral velocity in cm. per second.

EXAMPLE 14

Viscose rayon plant effluent containing 0.85% W/V zinc ions was electrolysed in a cell comprising a stainless steel cylinder as cathode (20 cm²) and a sheet platinum anode (20 cm²) at a cathode current density of 0.1 A/cm$^2$, the cylinder being rotated at 600 rpm. The solution pH was 1.1 and after 2 hours electrolysis there was a trace of zinc on the cathode.

EXAMPLE 15

Using the same cell as in Example 14 but at a cathode current density of 0.5 A/cm$^2$, 2 liters of the same effluent was electrolysed for 1 hour 40 minutes, the cylinder being rotated at 600 rpm. This resulted in a reduction in zinc content from 0.825% to 0.77% W/V, i.e., a current efficiency of 5.5%. Again the solution pH was 1.1.

EXAMPLE 16

A further sample of the same effluent as in Example 14 was electrolysed in a cell generally as in Example 14 but using a larger stainless steel cylinder cathode (120 cm$^2$). The starting pH was 1.03 and a current was passed at a cathode current density of 0.1 A/cm$^2$ for 2 hours, the cylinder being rotated at 600 rpm. There was no indication of zinc plate at the end of the electrolysis.

EXAMPLE 17

A further sample of the same effluent as in Example 14 was electrolysed in a cell comprising an aluminium cylinder cathode (57 cm$^2$) and a platinum anode (20 cm$^2$). The starting pH of the solution was 1, and the cylinder was rotated at 600 rpm. After 2.5 hours, at a cathode current density of 0.1 A/cm$^2$, there was virtually no zinc deposited.

EXAMPLE 18

A further sample of the same effluent as in Example 14 was electrolysed in the same cell as in Example 17. The cylinder was rotated at 600 rpm. but the starting pH was 5.8 because the solution had been partially neutralised with caustic soda. A current, at a cathode current density of 0.44 A/cm$^2$, was passed for 20 minutes. After this time the pH had fallen to 2.1 and the particles of zinc which had fallen off the cathode were redissolving. Analysis of the solution indicated that 1.8 gm. of zinc had been removed, i.e., a current efficiency of 18%.

EXAMPLE 19

A further sample of the same effluent as in Example 14 was electrolysed in a cell comprising an aluminium cylinder cathode (38.5 cm$^2$) and a platinum anode (20 cm$^2$). The cathode was rotated at 600 rpm., the starting pH was 5.75 and caustic soda was added during the electrolysis to maintain the pH between 5 and 6. The final pH was 6.4. A current, at a cathode current density of 0.44 A/cm$^2$, was passed for 1 hour 10 minutes. Powdered zinc was formed at the cathode and analysis of the solution indicated a current efficiency of 60%. The purity of the recovered zinc was 73.6% by weight.

EXAMPLE 20

A diaphragm cell was used to electrolyse a further sample of the same effluent as in Example 14. The cell comprised two plastic compartments separated from each other by a cation exchange membrane (Ionac MC3470, Ionac Chemical Corporation, Birmingham, New Jersey, U.S.A.). The cathode was an aluminium cylinder (38.5 cm$^2$) and the anode made by coiling ¼ inch stainless steel tube. This tube was also used as a cooling coil. The effluent sample was adjusted to pH6 and charged into the cathode compartment; the anode compartment was filled with 10% sodium hydroxide solution. A current of 17 amps was passed between the electrodes for 1 hour. The pH of the solution remained between 5 and 6 during the electrolysis, the cathode was rotated at 600 rpm, and the temperature maintained between 25°–30° C. Powdered zinc was formed at the cathode and analysis of the solution indicated a current efficiency of 43%.

EXAMPLE 21

A diaphragm cell generally as in Example 20 was used to electrolyse a further sample of the same effluent as in Example 14 except that an anion exchange membrane (Ionac MA 3472) was used. Also the cathode was the aluminium cylinder (38.5 cm$^2$), but the anode was platinum (20 cm$^2$). The electrolyte charged to the cathode compartment ws effluent adjusted to pH 6, the electrolyte charged to the anode compartment was 5% sulphuric acid solution. A current of 17 amps was passed between the electrodes for 1 hour. The pH of the solution remained between 5 and 6 during the electrolysis, the cathode was rotated at 600 rpm. and the temperature maintained between 25°–30° C.

Powdered zinc was formed at the cathode and analysis of the solution indicated a current efficiency of 35%.

The Examples 14 to 21 show that the yield of zinc obtained depends on the conditions under which electrolysis is carried out e.g. whether the effluent is highly acidic or near neutral, and whether the cell is provided with a diaphragm or not.

The electrolysis described in Example 21, using an anion exchange membrane, operates as follows:
Cathode process
$2\ Zn^{2+} \longrightarrow 2Zn$ 
Anode process
$2\ H_2O \longrightarrow O_2 + 4H^+$ 
Current carrying process
SO$_4$= moves from the cathode compartment through the anion exchange membrane into the anode compartment.

This means that the overall process is the removal of zinc from the catholyte and the formation of sulphuric acid in the anolyte, i.e., both zinc and sulphuric acid are recovered by this electrolysis.

That is one advantage. A further advantage is that the recovered zinc can be dissolved in the recovered sulphuric acid to give strong solutions (e.g. 4%) of zinc sulphate which can then be used in the rayon production process.

In general the advantages of the present invention may be summarised as follows:

Metals can be continuously and efficiently extracted from industrial effluents and other dilute solutions by means of the invention.

The mass transfer of metal in the rotating cylinder cathode cell of the invention may be up to 1000 times that of conventional plate-in-tank cells.

Production of the metal as a powder facilitates recovery of the metal from the cell.

Dirty effluents can be treated because the use of a diaphragm cell avoids or reduces anode corrosion by impurities.

Apart from its use in metal production, the invention can be used in pollution control. Effluents from which metals have been removed by the invention can be treated by biological means to remove organic impurities prior to discharge.

I claim:

1. A method of producing a metal powder from a dilute aqueous solution of the metal which solution has a low concentration of the metal ion, said method comprising the steps of subjecting the dilute aqueous solution of the metal to electrolysis in a cell having a rotating cylinder cathode, the current density of the cathode being proportional to the peripheral speed of the rotating cylinder cathode to the power of a number between 0.7 and 1.0 whereby the metal is deposited as a powder on the cathode, and recovering metal powder from the cathode.

2. A method as claimed in claim 1 in which the dilute aqueous solution contains from 2 to 10,000 parts per million of metal ion.

3. A method as claimed in claim 1 in which the electrolysis is carried out in accordance with the equation:

$$I = KCV^x$$

where I is the current density, K is a constant, C is the concentration of metal ion in aqueous solution, V is the peripheral velocity of the rotating cylinder cathode.

4. A method as claimed in claim 3 in which C = 2 to 10,000 parts per million, I = 1 mA/cm² to 10 Amps/cm² and V = 1 cm/sec to 10,000 cms/sec.

5. A method as claimed in claim 4 in which C = 2 to 1,000 parts per million, I = 1 mA/cm² to 1 Amp/cm² and V = 10 cms/sec to 2000 cms/sec and $x$ = 0.8 to 0.93.

6. A method as claimed in claim 1 in which the electrolysis is carried out in a cell having a diaphragm separating the cathode from the anode or anodes.

7. A method as claimed in claim 6 in which the diaphragm of the cell is an ion exchange membrane.

8. A method as claimed in claim 1 in which the metal powder produced is separated by physical means from the other materials contained in the cell.

9. A method as claimed in claim 1 in which the cell voltage is from 2 to 250 volts.

10. A method as claimed in claim 1 in which the cell voltage is from 2 to 20 volts.

11. A method as claimed in claim 1 in which the temperature of the electrolyte is from 20° C to 80° C.

12. A method as claimed in claim 1 in which the dilute aqueous solution is a mining liquor.

13. A method as claimed in claim 1 in which the dilute aqueous solution is a solution of a metal selected from the group consisting of copper, zinc, chromium, manganese, iron, cobalt, nickel, ruthenium, rhodium, palladium, silver, cadmium, indium, tin, iridium, platinum, gold, lead, uranium and rare earth metals.

14. A method as claimed in claim 1 in which the dilute aqueous solution is viscose rayon plant effluent containing zinc.

15. A method as claimed in claim 14 in which the effluent is that obtained by spinning viscose into sulphuric acid containing zinc salts.

16. A method as claimed in claim 14 in which the concentration of zinc in the effluent is from 1000 to 10,000 parts per million.

17. A method as claimed in claim 14 in which the electrolysis is carried out using an aluminium cathode.

18. A method as claimed in claim 14 in which the electrolysis is carried out in a diaphragm cell.

19. A method as claimed in claim 18 in which the diaphragm of the cell is an ion-exchange membrane.

20. A method as claimed in claim 18 in which the pH of the effluent during electrolysis is between 4 and 7.

21. A method as claimed in claim 20 in which the pH of the effluent is adjusted by the addition of alkali.

22. A method as claimed in claim 21 in which the alkali is caustic soda.

23. A method as claimed in claim 20 in which the effluent is buffered.

24. A method as claimed in claim 23 in which the effluent is buffered by the addition of sodium acetate.

25. A method as claimed in claim 15 in which sulphuric acid is also recovered from the effluent.

26. A method as claimed in claim 25 in which the recovered zinc is dissolved in the recovered sulphuric acid to form a solution for use in spinning viscose.

27. A method as claimed in claim 1 in which, the dilute aqueous solution is a solution of copper and the electrolysis is carried out in accordance with the equation:

$$I = KCV^x$$

where I, the current density, is from 1 mA/cm² to 1 Amp/cm²; K is a constant; C, the concentration of copper in the aqueous solution, is from 2 to 1,000 parts per million; V, the peripheral velocity of the rotating cylinder cathode, is from 10 cms/sec to 2,000 cms/sec; and $x$ is 0.8 to 0.93.

28. A method as claimed in claim 1 in which the dilute aqueous solution is a solution of zinc maintained during electrolysis at a pH between 4 and 7, the electrolysis being carried out in accordance with the equation:

$$I = KCV^x$$

where I, the current density, is from 1 mA/cm² to 1 Amp/cm²; K is a constant; C, the concentration of zinc in the aqueous solution, is from 2 to 1,000 parts per million; V, the peripheral velocity of the rotating cylinder cathode, is from 10 cms/sec to 2,000 cms/sec, and $x$ is 0.8 to 0.93.

29. A method as claimed in claim 1 in which the cathode is made of steel coated with the metal to be produced.

30. A method as claimed in claim 1 wherein the concentration of metal ion in the aqueous solution is in the range of 2 to 1000 ppm.

31. A method as claimed in claim 1, wherein the said power is a number between about 0.8 to 0.93.

32. A method as claimed in claim 31 wherein the concentration of metal ion in the aqueous solution is in the range of 2 to 1000 ppm.

* * * * *